United States Patent [19]

Suwa

[11] Patent Number: 5,790,695
[45] Date of Patent: Aug. 4, 1998

[54] IMAGE CODING DEVICE FOR CODING IMAGE SIGNAL TO REDUCE THE AMOUNT OF THE INFORMATION IN THE IMAGE

[75] Inventor: Akio Suwa, Sakura, Japan

[73] Assignee: Sharp Kabushiki Kaisha, Osaka, Japan

[21] Appl. No.: 642,601

[22] Filed: May 3, 1996

Related U.S. Application Data

[63] Continuation of Ser. No. 133,301, Oct. 8, 1993, abandoned.

[30] Foreign Application Priority Data

Oct. 15, 1992  [JP]  Japan ................... 4-277394

[51] Int. Cl.$^6$ .............. G06K 9/00; G06K 9/36; G06K 9/38
[52] U.S. Cl. .............. 382/166; 382/103; 382/233; 382/236; 382/238; 382/239; 382/251; 382/291; 382/12; 348/405; 348/407; 348/415; 348/397; 358/433
[58] Field of Search .................. 382/103, 162, 382/164, 166, 173, 232, 233, 236, 238, 239, 251, 291; 348/405, 407, 409, 413, 415, 416, 397, 399, 652–657; 358/432, 433

[56] References Cited

U.S. PATENT DOCUMENTS

| | | | |
|---|---|---|---|
| 4,369,464 | 1/1983 | Temime | 348/410 |
| 4,855,825 | 8/1989 | Santamaki et al. | 348/415 |
| 4,943,855 | 7/1990 | Bheda et al. | 348/398 |
| 4,982,285 | 1/1991 | Sugiyama | 348/415 |
| 4,991,223 | 2/1991 | Bradley | 382/165 |
| 5,051,840 | 9/1991 | Watanabe et al. | 382/235 |
| 5,083,201 | 1/1992 | Ohba | 348/399 |
| 5,086,480 | 2/1992 | Sexton | 382/9 |
| 5,296,945 | 3/1994 | Nishikawa et al. | 358/518 |
| 5,341,442 | 8/1994 | Barrett | 382/166 |
| 5,585,944 | 12/1996 | Rodriguez | 382/162 |
| 5,596,362 | 1/1997 | Zhou | 382/118 |

FOREIGN PATENT DOCUMENTS 330445  2/1989  European Pat. Off. ....... H04N 7/137

OTHER PUBLICATIONS

"Compatible Mixed Bit Rate Coding of Video For ATM Networks" E.Minami,Supercomm/ICC '92, Jun. 1992, vol. 1, pp. 537–543.

"Model–Based/Waveform Hybrid Coding For Low–Rate transmission Of Facial Images" Nakaya et al.,IEICE Transactions on Communications, May 1992, vol. E75–B, No. 5, pp. 377–384.

"Patent Abstracts of Japan", vol. 15, No. 330, Aug. 1991.

*Primary Examiner*—Leo Boudreau
*Assistant Examiner*—Bipin Shalwala

[57] ABSTRACT

An image coding device for coding image data includes a motion inter-frame compensation predicting unit for predictively coding an image signal at each frame based on an input image signal and a stored image signal and outputting a predictive error signal, an orthogonal transformation unit for orthogonally transforming the predictive error signal, and a quantizing unit for quantizing a transforming coefficient formed by the orthogonal transformation. The image coding device further provides an image area detector for detecting a specified image area from the image represented by the image signal and error quantizing unit for deriving a quantizing error of the specified area. The quantized error derived by the unit is re-quantized in an error quantizing unit under control of an error coding control unit.

8 Claims, 9 Drawing Sheets

IMAGE CODING DEVICE FOR CODING IMAGE SIGNAL TO REDUCE THE AMOUNT OF THE INFORMATION IN THE IMAGE

This application is a continuation of application Ser. No.08/133,301 filed on Oct. 8, 1993, now abandoned.

BACKGROUND OF THE INVENTION

1. Field of the Invention

The present invention relates to an image coding device which is capable of reducing the amount of information contained in an image by coding an input image signal, in particular, a moving image.

2. Description of the Related Art

In recent days, with the prevail of service integrated digital networks (referred to as a ISDNs), as new communication service, image communication service has been more and more requested. Concretely, a TV phone or a TV conference system has requested such service.

In general, in the case of transmitting image information as in a TV phone or a TV conference system, since the image consumes a massive amount of information, in light of a transmission speed of a line and the cost in the transmission, it is necessary to compress and code the amount of information of the transmitted image for reducing the amount of information in transmission.

As a coding method for compressing the information, various methods have been considered. Some of them are going to be realized in the field of a TV phone or a TV conference system. Further, a new communication network, representatively a broadband integrated service digital network (referred to as a B-SIDN), is now actively studied for providing higher service. As a high-efficiency coding method for an image being now on the way of implementation, there has been known a motion compensated inter-frame prediction orthogonal transformation method. This method takes the steps of dividing an image into plural small blocks and performing an orthogonal transformation such as a discrete cosine transformation with respect to various predictive error signals in each small block, quantizing the resulting transforming coefficient for coding, and transmitting the coded data.

Figure 9:
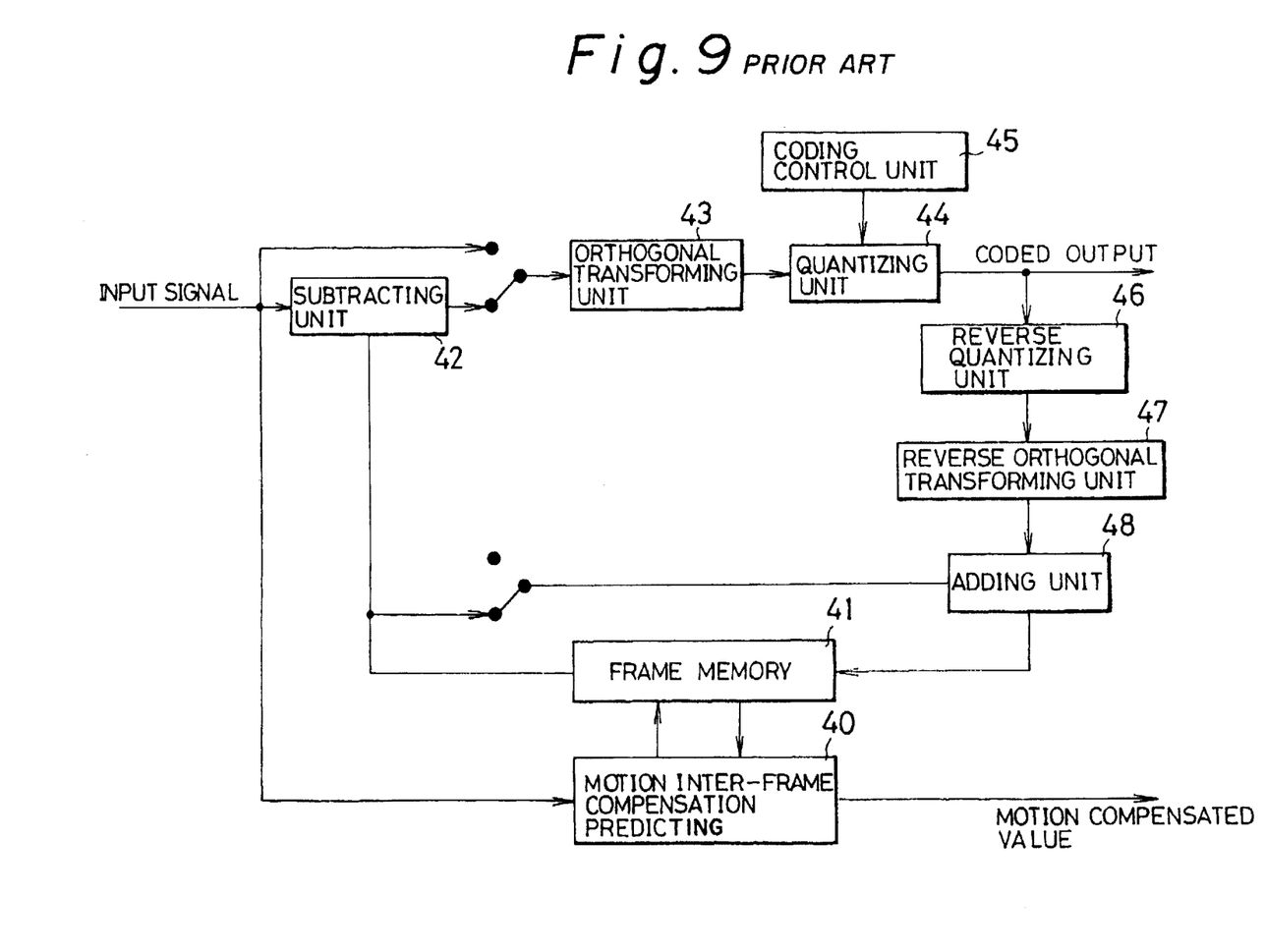
FIG. 9 is a block diagram showing an arrangement of the conventional image coding device.
Figure 10:
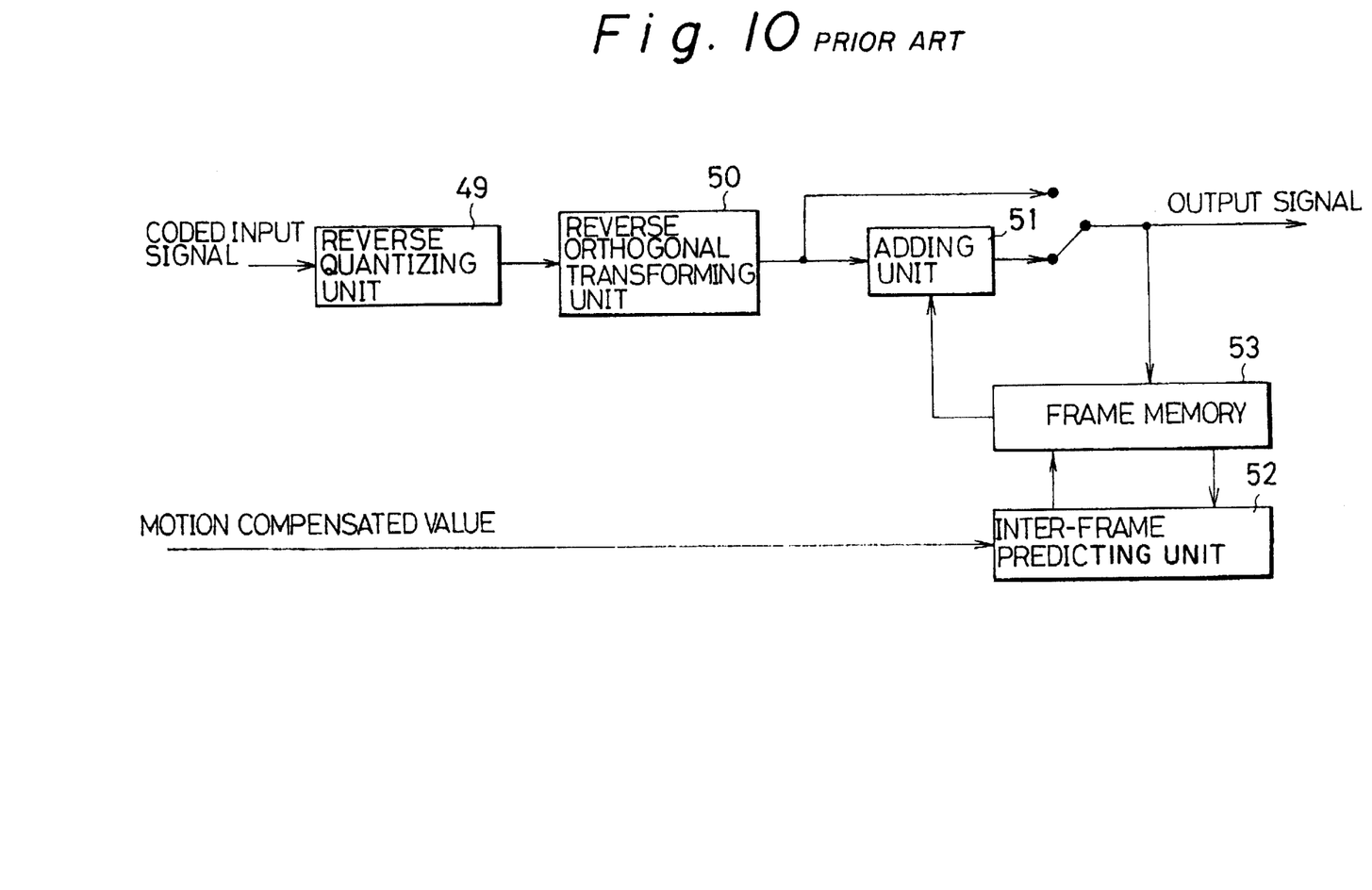
FIG. 10 is a block diagram showing an arrangement of the conventional image coding device.

FIG. 9 shows a coding device arranged on the foregoing prior art. FIG. 10 is a block diagram showing an arrangement of the foregoing conventional decoding device.

An input image signal is inter-frame predicted as compensating for the motion at each image frame by means of a motion inter-frame compensation predicting unit 40. To detect the motion in the motion compensation, the image signal of a one-previous frame stored in a frame memory 41 and the input image signal are divided into blocks. Which portion of the image signal of a one-previous frame is moved to the block is detected. The motion inter-frame compensation predicting unit 40 operates to read an image frame coded of a one-previous frame stored in the frame memory 41 as a predictive value. Then, a difference between the input image frame and the predictive value read from the frame memory 41 is derived in a differential operating unit 42 for performing an inter-frame coding operation.

In succession, the predictive error signal output from the differential operating unit 42 is transmitted to an orthogonal transforming unit 43 in which an orthogonal transformation is performed. The orthogonal transforming unit 43 serves to output an orthogonally transformed coefficient. The coefficient is quantized in the quantizing unit 44 at the quantization level sent from a coding control unit 45. The quantized output from the quantizing unit 44 is output to the external as a coded result. The quantized output from the quantizing unit 44 is also sent to a reverse-quantizing unit 46. The reverse-quantizing unit 46 performs a reverse process to the quantizing unit 44 so that the unit 46 may output an orthogonally transformed coefficient and a reverse orthogonally transformed coefficient. In the reverse orthogonally transforming unit 47, the reverse orthogonally transforming operation is carried out by using the coefficients. In these serial operating process, to efficiently perform an operation like motion detection in compensating for the motion, the image is divided to blocks each having a predetermined size. The output of the reverse orthogonal transforming unit 47 is added to the predictive value read out of the frame memory 41 in the adding unit 48. Then, the added value is stored in the frame memory 41 and is used for inter-frame prediction in the next input image frame. The input image signal is coded according to such a loop (coding loop).

In the decoding device, like the process in the coding loop of the coding device, the input coded signal is sent to a reverse-quantizing unit 49 in which the reverse operation to the quantizing unit 44 is performed. The orthogonally transformed coefficient is output to the reverse orthogonal transforming unit 49.

In an adding unit 51, the output of the reverse orthogonal transforming unit 50 is added to a predictive value read out of a frame memory 53 based on a predictive motion value from an inter-frame predicting unit 52. The added result is output as a signal and is stored in the frame memory 53.

The foregoing conventional image coding device allows a certain degree of error for reducing the amount of information when quantizing the orthogonally transformed result. The allowed error makes the quality of the image degraded. This has been a disadvantage. The quantization is controlled by the amount of generated codes and the transmission capacitance. In each divided block, the quantizing condition is changed. When the coded image is viewed as an overall image, a block distortion in which a block being processed is striking or coarseness variable in each block of the screen takes place so that the quality of the image may be disadvantageously degraded.

Further, whether or not the content of the image on the block to be coded may be an important portion to transmission or storage, the coding operation is evenly controlled for any of the blocks. Hence, the image quality on an important portion cannot be held so that the overall image may be disadvantageously degraded. Further, by reverse-quantizing and reverse orthogonally transforming all the outputs of the quantizing unit for locally decoding, the locally decoded result is stored in the frame memory and is used for inter-frame predictive coding. If lost of information takes place in a line such as a broadband ISDN, the inter-frame predictive coding does not properly function, thereby remarkably lowering the quantity of the image.

SUMMARY OF THE INVENTION

It is therefore an object of the invention to provide an image area detector which can recognize an important portion in the image to be coded.

It is another object of the invention to provide an image coding device which uses an image area detector for recognizing an important portion in the image to be coded and enables to properly code the information so as to obtain an excellent image without having to degrade the important portion even if lost of the information in a communication line takes place.

It is a further object of the invention to provide an image decoding device which is capable of preventing remarkable lowering of image quality if lost of the information takes place in a communication line and decoding the image data in a manner to obtain an excellent image without having to degrade a significant part in the object.

According to one aspect of the invention, the first object is achieved by an image area detector arranged to provide means for dividing an input image signal into plural blocks; means for storing an image signal, means for detecting an amount of motion of each frame at each block from the image signals input and stored in the storing means, means for deriving an average luminance and an average chrominance in each block; means for deriving a differential value in each block, means for deriving an average luminance of each overall frame; and means for specifying the plural areas based on the motion, the average luminance and chrominance, the differential values, and the average luminance of the frame.

In the arrangement, it is possible to specify the significant part in the image and obtain the index for area adaptive coding.

According to another aspect of the invention, the second object is achieved by the image coding device arranged to provide means for predictively coding an image signal at each frame based on an input image signal and a stored image signal and outputting a predictive error signal; means for orthogonally transforming the predictive error signal; means for quantizing a transforming coefficient formed by the orthogonal transformation; image area detecting means for dividing the input image signal into plural blocks and specifying each of the area blocks; means for deriving a quantizing error of the specified area; and means for re-quantizing the quantized error derived by the means for deriving the quantizing error, the data quantized by the quantizing means and the quantizing error re-quantizing means being configured in a coding format.

In the arrangement, the coded output is divided into two hierarchical classes, that is, the output of the quantizing means and the output of the error quantizing means. The quality of the image is improved against the lowering of the quality of an image in the coded loop in an important area of the coded image. To transmit the image, if the output of the quantizing means in the loop is transmitted first, only the error signal is lost even in the transmission path where information may be lost. Hence, it is possible to eliminate the adverse effect of the coding loop on the inter-frame prediction, thereby suppressing the degradation of the coded image to a minimum.

According to third aspect of the invention, the third object is achieved by decoding device arranged to provide means for separating the quantized data and the quantizing error re-quantizing data from the coded format; means for reverse-quantizing the separated quantizing data; means for reverse-quantizing the separated quantizing error re-quantizing data; means for adding a transforming coefficient re-quantized by the re-quantizing means to the error data reverse-quantized by the quantizing error reverse-quantizing means and performing a reverse orthogonal transformation with respect to the added result and outputting a predictive error signal; and means for storing the previous image signal for obtaining an image signal from the predictive error signal output by the reverse orthogonal transforming means.

In the arrangement, the quality of an image in the important area is allowed to be improved. To receive an image, the error reverse quantizing means operates independently. Hence, in the transmission path where information may be lost, only the error signal is lost. This makes it possible to decode an image without having to have an adverse effect on the inter-frame prediction in a coding loop.

Further objects and advantages of the present invention will be apparent from the following description of the preferred embodiment of the invention as illustrated in the accompanying drawings.

DESCRIPTION OF THE PREFERRED EMBODIMENTS

Hereinafter, the description will be oriented to an image area detector, an image coding device arranged to use the image area detector and an image decoding device according to an embodiment of the present invention as referring to the drawings.

First, the description will be oriented to an image area detector according to an embodiment of the present invention as referring to FIGS. 1 to 6.

Figure 1:
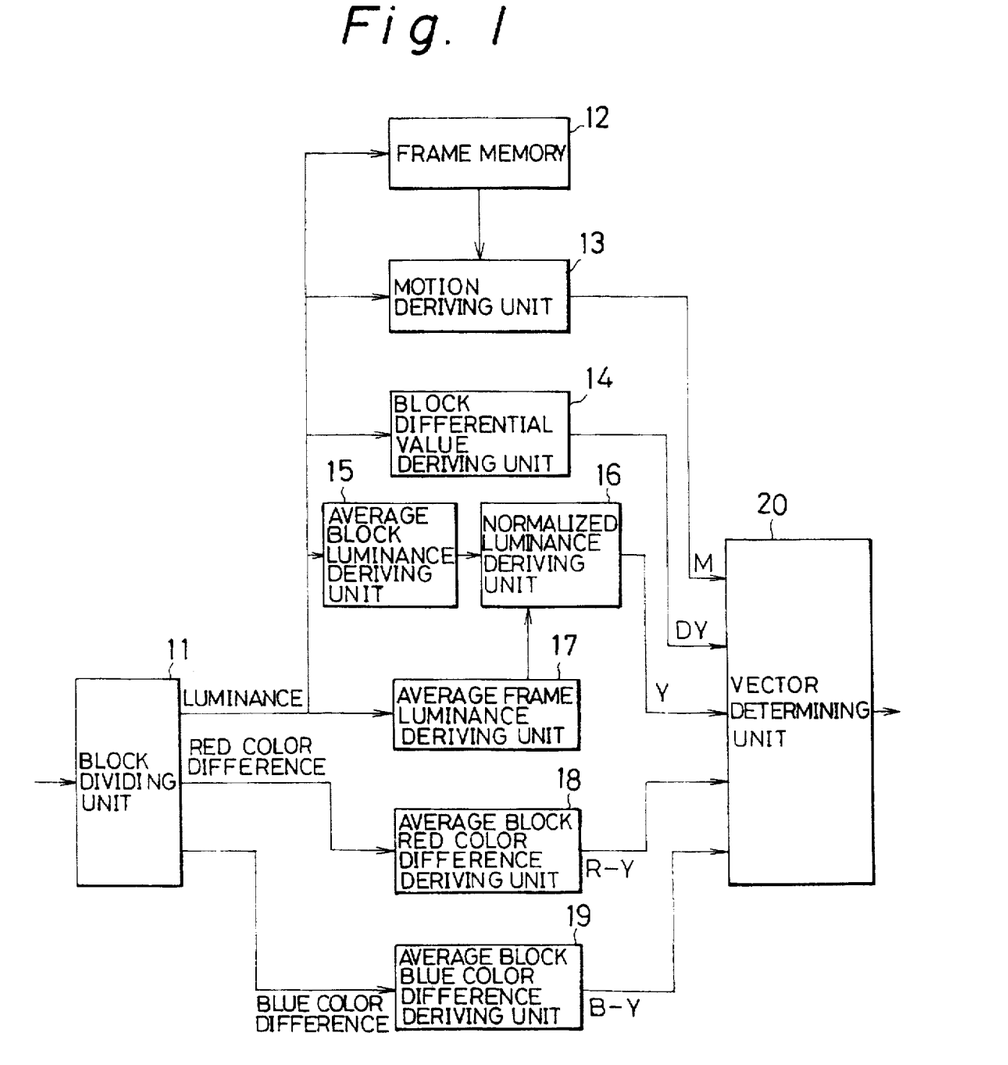
FIG. 1 is a block diagram showing an arrangement of an image area detector according to an embodiment of the present invention.

FIG. 1 is a block diagram showing an arrangement of an image area detector according to the embodiment of the present invention.

The image area detector shown in FIG. 1 is arranged to provide a block dividing unit 11 serving as dividing means, a frame memory 12 serving as storing means connected to the block dividing unit 11, a motion calculating means 13 serving as motion detecting means connected to the block dividing unit 11 and the frame memory 12, a block differential value deriving unit 14 serving as differential value deriving means connected to the block dividing unit 11, an average block luminance deriving unit 15 composing part of means for deriving an average luminance and chrominance of each block, the means being connected to the dividing unit 11, a normalized luminance deriving unit 16 connected to the average block luminance deriving unit 15, an average frame luminance deriving unit 17 serving as average frame luminance deriving means connected to the block dividing unit 11 and the normalized luminance deriving unit 16, an average block red difference deriving unit 18 composing part of average block luminance and chrominance deriving means connected to the block dividing unit 11, an average block blue difference deriving unit 19 composed of part of average block luminance and chrominance deriving means connected to the block dividing unit 11, and a vector determining unit 20 serving as means for specifying an area connected to the motion deriving unit 13, the block differential value deriving unit 14, the normalized luminance deriving unit 16, the average block red color difference deriving unit 18. The input image signal is divided into small area blocks. For each block, the motion of the block and the average luminance inside of the block normalized by the average luminance of the overall frame, the average chrominance inside of the block, and the differential value are derived. They are compared with the feature values in a specific area for determining the area.

Figure 2:
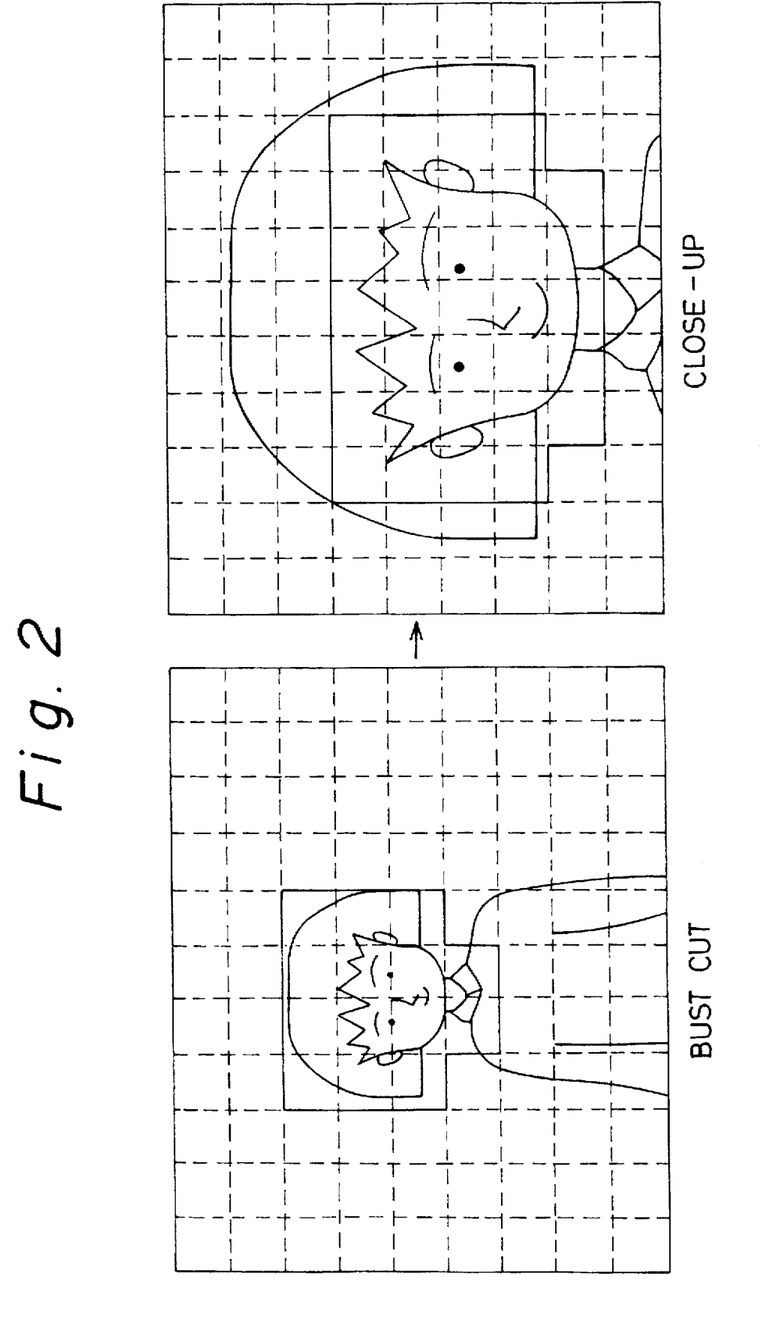
FIG. 2 is an explanatory view showing an important area detected by the image area detector shown in FIG. 1.

Herein, the description will be oriented to how the important area is determined in the case that a face area shown in FIG. 2 is set as an important area.

To determine whether or not a portion corresponds to a face portion, recognition of the form of the face may be considered. To do so, a massive amount of operating time is taken. Hence, this is not proper to the coding device for transmission or storage.

Hence, according to the present invention, the face is determined according to the feature amounts:

(1) the face has a skin color.

(2) the face has an outline, an eyebrow, eyes, a mouth and so forth and a lot of differential values.

(3) In the case of a TV phone or a TV conference, the face keeps its luminance high.

(4) In the case of a TV phone or a TV conference, a moving object is mainly a FIG., in particular, a motion of the face.

Figure 3:
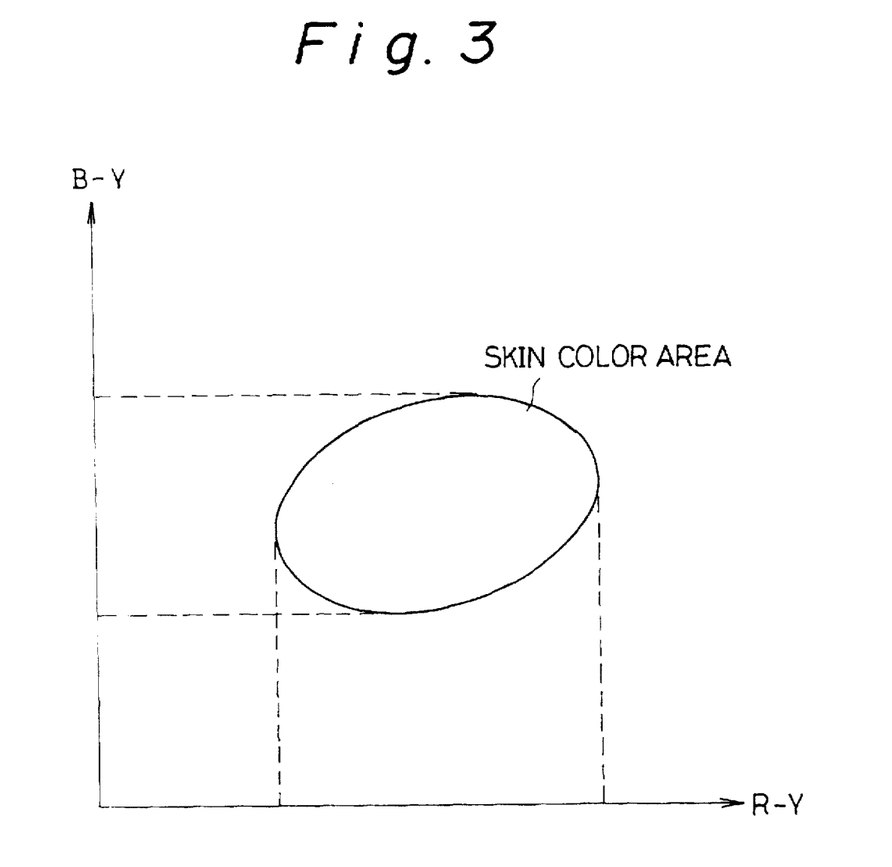
FIG. 3 is an explanatory view showing a skin color area to be defined only by the color difference component detectable by the image area detector shown in FIG. 1.

At first, since the face has a skin color, taking two color difference components (R-Y and B-Y) on an axis of abscissa and an axis of ordinance, the distribution stays in a certain range as shown in FIG. 3.

Thus, the average values of a R-Y component and a B-Y component of the input block are derived respectively. Based on the average values, it is determined whether or the block corresponds to a face. In actuality, however, the skin color does not always indicate the face. A landscape often has a skin color. In the block containing an outline portion, a background color is also contained as well as the face color.

If the device applies to a TV phone or a TV conference, since what is important is generally to transmit the information about a face, in almost of the transmitted images, focus is placed on the faces. Further, those images are kept in a bright state with lighting. Hence, the transmitted image keeps an eyebrow, eyes, a mouth and so forth clear. It means that the face portion has a lot of differential values and high luminance. Moreover, the main object is to transmit the information about a face. It means that a moving potion on the transmitted image mainly indicates a face portion.

According to the present invention, the areas determined as a face area are;

(a) Area keeping a certain luminance range, a skin color and a certain degree of motion (b) Area keeping a certain luminance range, a lot of differential values and a certain degree of motion.

Figure 4:
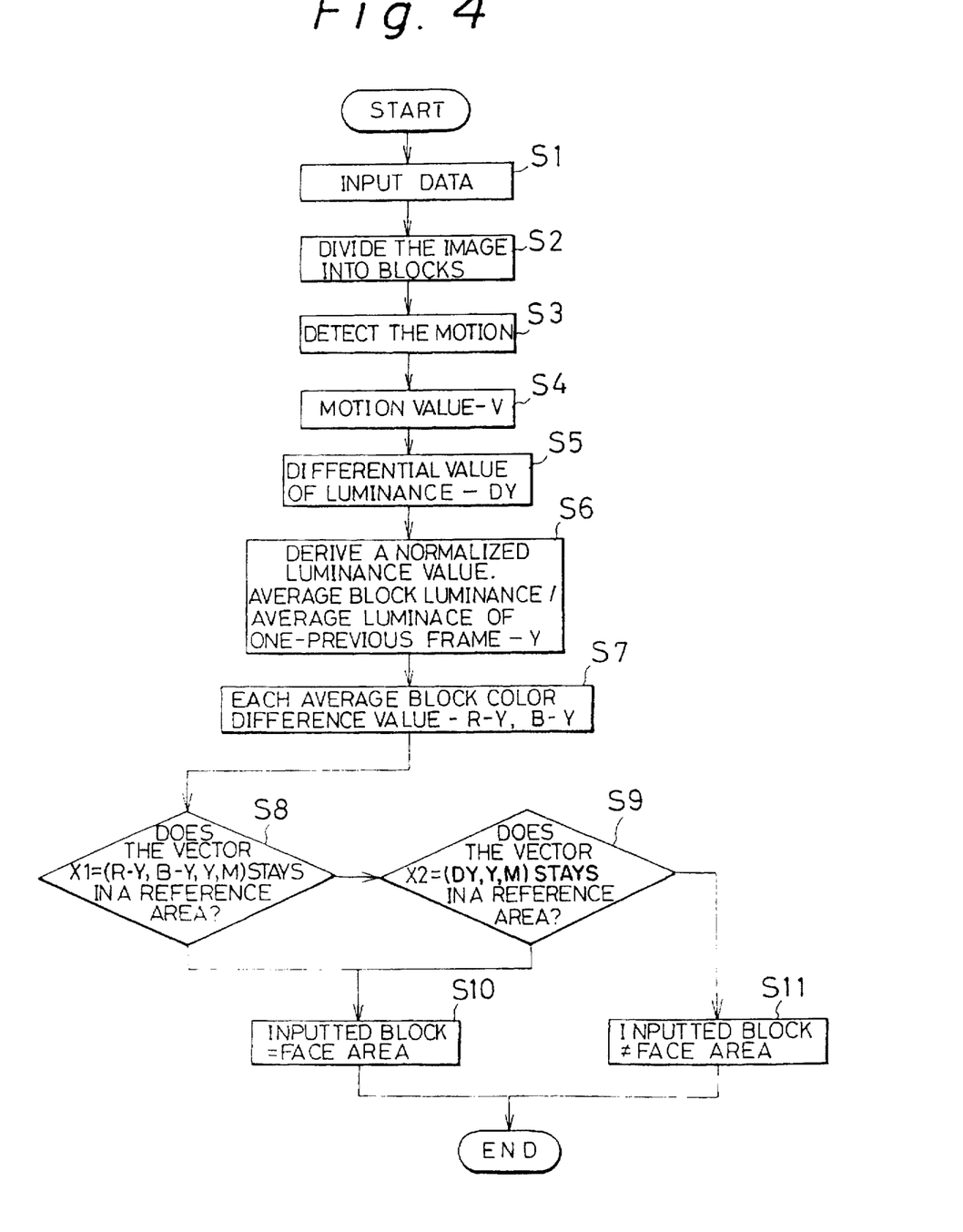
FIG. 4 is a flowchart for describing the operation of the image area detector shown in FIG. 1.

Next, the operation of the image area detector shown in FIG. 1 will be described as referring to the flowchart of FIG. 4.

At first, the block dividing unit 11 serves to divide the input signal into small blocks according to the luminance and the color difference (steps S1 and S2). The motion deriving unit 13 serves to compare the divided luminance with the frame data read out of the frame memory 12 for retrieving the motion (step S3) and derive the motion value M (step S4).

The block differential value deriving unit 14 serves to derive a sum DY of the differential values at each block (step S5). The average block luminance deriving unit 15 serves to derive an average luminance in the block and the average frame luminance deriving unit 17 serves to derive an average luminance of the previous frame. The normalized luminance deriving unit 16 serves to derive a normalized luminance Y by using the average luminance of the previous frame derived by the average frame luminance deriving unit 17 in order to correspond to the change of luminance (step S6). The average block red difference deriving unit 18 and the average block blue difference deriving unit 19 serve to derive the average values R-Y and B-Y of the color difference components derived as above (step S7).

Figure 5:
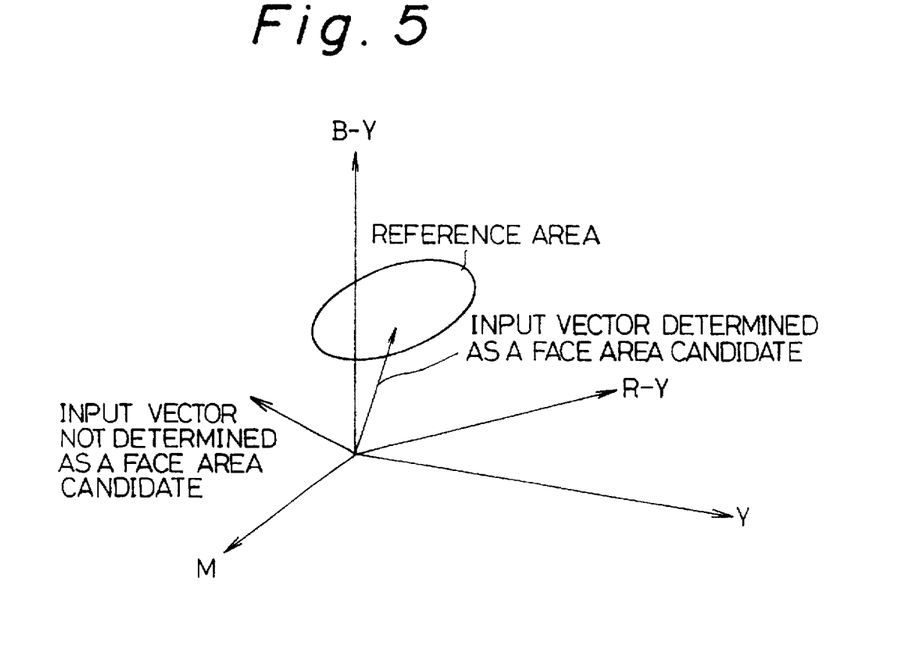
FIG. 5 is an explanatory view showing a vector space for detecting an area.
Figure 6:
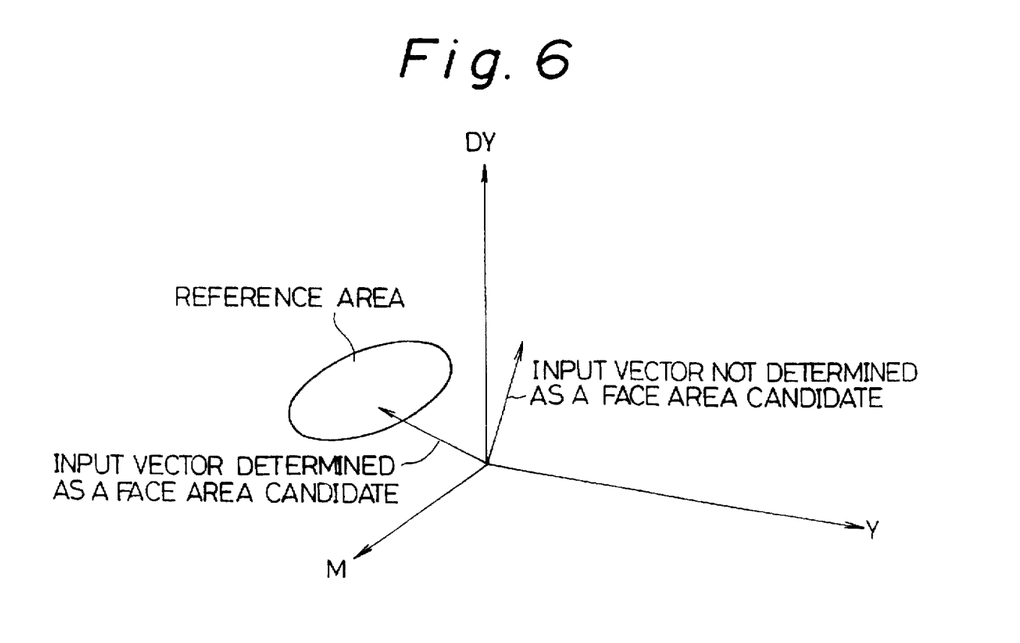
FIG. 6 is another explanatory view showing a vector space for detecting an area.

The vector determining unit 20 serves to determine a face based on the above-mentioned derived five parameters input thereto. In the determining process, by considering a four-dimensional vector space consisting of an average value R-Y of the color difference component, an average value B-Y of the color difference component, a normalized luminance Y, and a motion value M as shown in FIG. 5 and a three-dimensional space consisting of a sum DY of differential values at each block, a normalized luminance Y and a motion value M as shown in FIG. 6 with respect to the foregoing five parameters, the reference vector area is pre-created for a portion corresponding to a face based on various image data in each of the vector spaces. It is determined whether or not the vector of the input block corresponds to a reference vector area (steps S8 and S9).

The vector determining unit 20 serves to determine whether or not the input block corresponds to a face area based on the methods for determining a face area as shown in FIGS. 5 and 6. Then, the determined result is output (steps S10 and S11).

Next, the description will be oriented to an image coding device according to an embodiment of the present invention.

Figure 7:
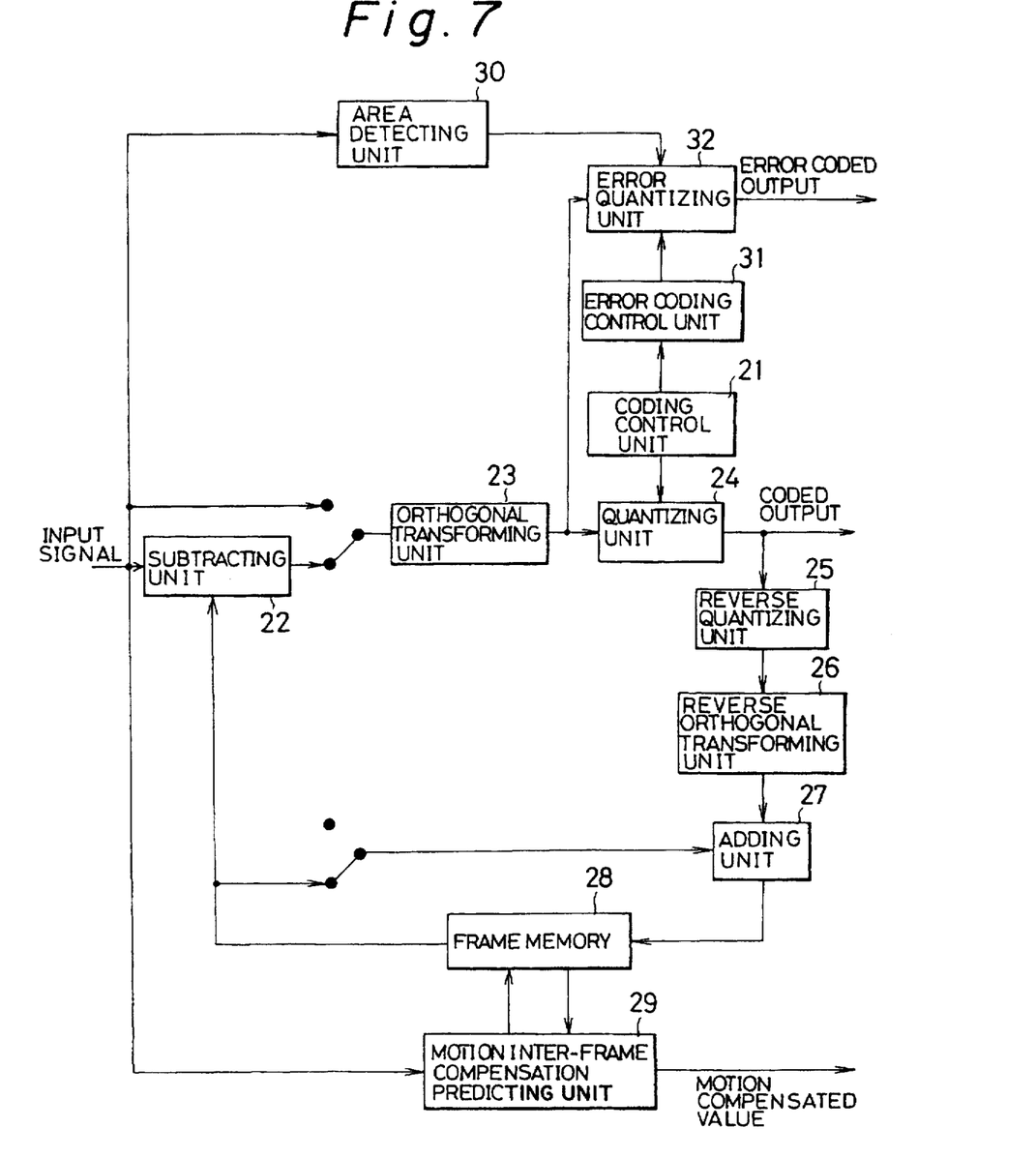
FIG. 7 is a block diagram showing an arrangement of an image coding device according to an embodiment of the present invention.

FIG. 7 is a block diagram showing an arrangement of an image coding device according to an embodiment of the present invention.

The image coding device shown in FIG. 7 is arranged to have a coding control unit 21, a subtracting unit 22, an orthogonal transforming unit 23 serving as orthogonal transforming means being connected to the subtracting unit 22, a quantizing unit 24 serving as quantizing means connected to the orthogonal transforming unit 23, a reverse-quantizing unit 25 connected to the quantizing unit 24, a reverse-orthogonal transforming unit 26 connected to the reverse-quantizing unit 25, an adding unit 27 connected to the reverse orthogonal transforming unit 26, a frame memory 28 connected to the adding unit 27, a motion inter-frame compensation predicting unit 29 serving as predictive coding means connected to the frame memory 28, an image area detecting unit 30 served as image area detecting means, an error coding control unit 31 connected to the coding control unit 21, an error quantizing unit 32 serving as quantized error deriving means connected to the orthogonal transforming unit 23, the image area detecting unit 30 and the error coding control unit 31, and a multiplexer (not shown) connected to receive error coded output, coded output and motion compensated value.

Next, the description will be oriented to the operation of the image coding device as shown in FIG. 7.

At first, an input image signal is predicted at each image frame in an inter-frame compensating manner in the motion inter-frame compensation predicting unit 29. The detection of a motion in a motion compensating manner is carried out by dividing the image signal of one-previous frame stored in the frame memory 28 and the input image signal into blocks each having a certain size and detecting which portion of the image signal of a one-previous frame is moved to the block of the input image signal.

By using the detected motion, the motion inter-frame compensation predicting unit 29 serves to read the image frame coded at one previous frame stored in the frame memory 28 as a predictive value, while outputting a motion compensated value through the multiplexer. Then, the subtracting unit (difference operating unit) 22 serves to derive a difference between the input image frame and a predictive value read out of the frame memory 28 for performing an inter-frame predictive coding. In succession, the predictive error signal output from the difference operating unit 22 is sent to the orthogonal transforming unit 23 in which the orthogonal transforming operation is carried out. The orthogonal transforming unit 23 serves to output an orthogonally transformed coefficient. The coefficient is quantized according to the quantizing level sent from the coding control unit 21 in the quantizing unit 24. The quantized amount of information is compressed. The quantized output from the quantizing unit 24 is output as a coded result to the outside through the multiplexer and to the reverse-quantizing unit 25. The reverse-quantizing unit 25 performs the reverse operation to the quantizing unit 24 and outputs the orthogonally transformed coefficient and then the reverse orthogonally transformed coefficient. Then, the reverse orthogonal transforming operation is done with the coefficients in the reverse orthogonal transforming unit 26.

The coded output from the quantizing unit 24 and the motion compensated value from the prediction unit 29 are configured in a coding format by the multiplexer together with an error coded output described below.

The above-mentioned series of operations are carried out at each of the blocks into which the image is divided. The output of the reverse orthogonal transforming unit 26 is added to a predictive value read out of the frame memory 28 in the adding unit 27. Then, the added value is stored in the frame memory 28. It is used for inter-frame prediction at the next frame of an input image. The input image signal is coded in a loop manner (coding loop).

The input signal is also supplied to image area detecting unit 30, while being coded in the coding loop as described above. The image area detecting unit 30 serves to detect whether or not the area is important at each block and output the detected result to the error quantizing unit 32. The image area detecting unit 30 has the same construction as the image area detector explained in connection with FIGS. 1 to 6. To make the quantity of the important area better, the error coding control unit 31 serves to control the quantizing level in the important area into a more fine level than the quantizing level in the coding loop in a manner to apply to the quantizing level controlled in a coding loop from the coding control unit 21 and define the re-quantizing level. The re-quantizing level is output to the error quantizing unit 32. The error quantizing unit 32 serves to derive the coding error caused as a result of coding only the important area in the coding loop in response to the detected result of the image area detecting unit 30. The error is coded according to the error quantizing level sent from the error coding control unit 31 and then the coded error is output. By re-quantizing the error in an important area, it is possible to improve the quality of a coded image as compared with the coded image transmitted only in a coding loop.

Next, the description will be oriented to an image decoding device according to an embodiment of the present invention.

Figure 8:
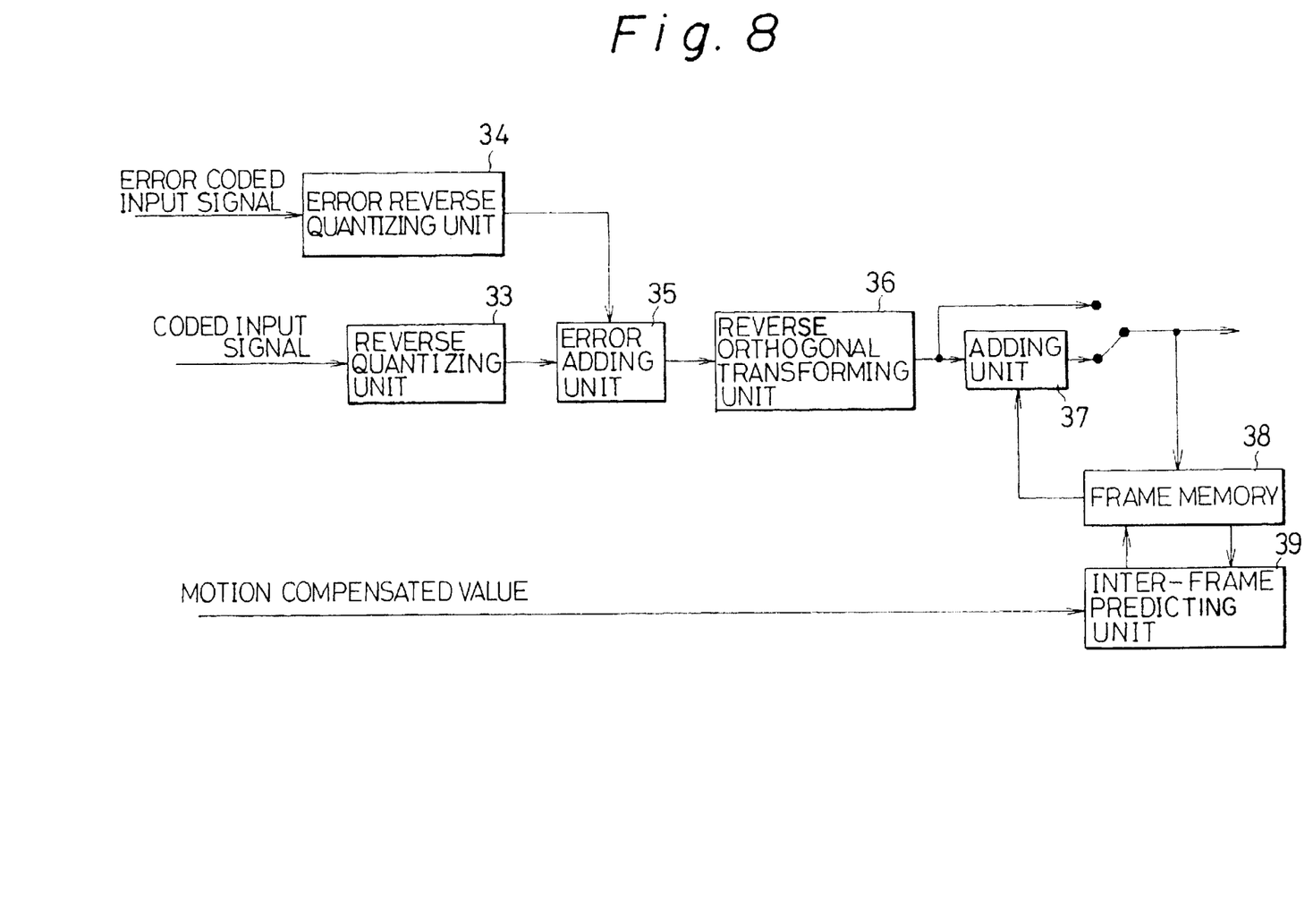
FIG. 8 is a block diagram showing an arrangement of an image decoding device according to an embodiment of the present invention.

FIG. 8 is a block diagram showing an arrangement of an image decoding device according to an embodiment of the present invention.

The image decoding device as shown in FIG. 8 is arranged to have a demultiplexer (not shown), a reverse-quantizing unit 33 served as reverse-quantizing means, an error reverse-quantizing unit 34 served as quantized error reverse-quantizing means, an error adding unit 35 connected to both of the reverse-quantizing unit 33 and the error reverse-quantizing unit 34, a reverse orthogonal transforming unit 36 served as reverse orthogonal transforming means connected to the error adding unit 35, an adding unit 37 connected to the reverse orthogonal transforming unit 36, a frame memory 38 served as storing means connected to the adding unit 37, and an inter-frame predicting unit 39 connected to the frame memory 38.

Next, the operation of the image decoding device shown in FIG. 8 will be described.

In the image decoding device shown in FIG. 8, the coded input signal, error coded input signal and motion compensated value are separated from each other through the demultiplexer. After separation, the coded input signal is reverse-quantized in the reverse-quantizing unit 33. At a time, the error coded input signal is revere-quantized in the error reverse-quantizing unit 34. The reverse quantized results are added to each other in the error adding unit 35. This results in improving the quality of an image in the important area.

Next, the description will be oriented to the use of the image coding device and the image decoding device according to the present invention in a transmission path for broadcast communication where lost of information takes place.

The information coded by the image coding device according to the present invention can be considered as two hierarchical classes, that is, an output from the quantizing unit 24 and an output from the error quantizing unit 32. The output result from the error quantizing unit 32 does not have an adverse effect on the coding loop. Hence, if the output of the quantizing unit 24 is output first and the output of the error quantizing unit 32 is output first, only the output of the error quantizing unit 32 is lost in the case of lost of information. The loss of information does not have an adverse effect on the inter-frame prediction.

In the image decoding device according to the present invention, only when the error coding input signal is applied, the error adding unit 35 performs an addition and a decoding operation. If the information is lost, the conventional image coded bus is constantly kept. Hence, the coded image quality is guaranteed if the conventional coding device applies to a transmission path with no loss of information.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image communication system, comprising:

an image communication device for coding image data, including means for predictively coding an image signal at each frame based on an input image signal and a stored image signal and outputting a predictive error signal;

means for orthogonally transforming said predictive error signal;

means for quantizing a transforming coefficient formed by said orthogonal transformation;

image area detecting means for detecting a specified image area from the image represented by said image signal;

means for deriving a quantizing error of said specified area;

means for re-quantizing said quantized error derived by said means for deriving said quantizing error with a quantizing level determined in such a manner that the quantizing level of said specified area is finer than a quantizing level of portions other than said specified area to make an image quality of said specified area better than an image quality of other portions of the image;

means for configuring in a coding format the data quantized by said quantizing means and said quantizing error re-quantizing means; and an image decoding device for decoding coded signals coded by said image coding device, including means for separating the quantized data and the quantizing error re-quantized data from said coded format, means for reverse-quantizing said separated quantized data, means for reverse-quantizing the separated quantizing error re-quantized data, means for adding a transforming coefficient re-quantized by said re-quantizing means to the error data revere-quantized by said quantizing error reverse-quantizing means and performing a reverse orthogonal transformation with respect to said added result and outputting a predictive error signal, and means for storing the previous image signal to obtaining an image signal from said predictive error signal output by said reverse orthogonal transforming means.

2. An image communication system as claimed in claim 1, wherein said image area detecting means includes means for dividing an input image signal into plural area blocks, means for storing an image signal, means for detecting an amount of motion of each frame at each block from said image signals input and stored in said storing means, means for deriving an average luminance and an average chrominance in each block, means for deriving an average luminance of each overall frame, and means for determining said specified image area from said plural area blocks based on said motion, said average luminance and chrominance, said differential values, and said average luminance of the frame including means for designating an area block as part of said specified image area when the frame has a luminance in a predetermined range, and the area block has a predetermined color and a certain degree of motion and means for designating an area block to be part of said specified image area when the frame has a luminance in a predetermined range, and the area block has a differential value larger than a predetermined value and a certain degree of motion.

3. An image communication system as claimed in claim 2, wherein said specified image area is a face area.

4. An image communication system as claimed in claim 2, wherein said dividing means outputs luminance signal and color difference signals in divided each block.

5. An image communication system as claimed in claim 4, wherein said average luminance and chrominance delivering means includes means for delivering an average luminance in each block, and means for delivering an average value of color difference.

6. An image communication system as claimed in claim 5, further comprising means for deriving a normalized luminance by using the average luminance of the previous frame and average luminance of each block.

7. An image communication system as claimed in claim 6, wherein said determining means includes vector determining means for determining as to whether a vector, composed of the average of color difference, normalized luminance and motion value, stays in a reference area.

8. An image communication system as claimed in claim 6, wherein said determining means includes vector determining means for determining as to whether a vector, composed of the differential value of luminance, normalized luminance and motion value, stays in a reference area.

* * * * *